(12) United States Patent
Giannini

(10) Patent No.: US 7,418,407 B2
(45) Date of Patent: Aug. 26, 2008

(54) METHOD FOR ELECTRONIC GIFTING USING MERGING IMAGES

(75) Inventor: Robert Giannini, Jersey City, NJ (US)

(73) Assignee: Jarbridge, Inc., Boise, ID (US)

( * ) Notice: Subject to any disclaimer, the term of this patent is extended or adjusted under 35 U.S.C. 154(b) by 313 days.

(21) Appl. No.: 10/899,606

(22) Filed: Jul. 27, 2004

(65) Prior Publication Data
US 2005/0044005 A1 Feb. 24, 2005

Related U.S. Application Data

(62) Division of application No. 09/527,986, filed on Mar. 17, 2000, now abandoned.

(60) Provisional application No. 60/167,493, filed on Nov. 24, 1999, provisional application No. 60/159,476, filed on Oct. 14, 1999.

(51) Int. Cl.
G06Q 30/00 (2006.01)
G06F 17/30 (2006.01)
G07F 7/00 (2006.01)

(52) U.S. Cl. .......................... 705/26; 705/27
(58) Field of Classification Search ............ 705/26, 705/27, 14
See application file for complete search history.

(56) References Cited
U.S. PATENT DOCUMENTS
3,590,434 A 7/1971 Watts, Jr. et al.
4,149,246 A 4/1979 Goldman .......... 364/200
4,232,334 A 11/1980 Dyson .............. 358/93
(Continued)

FOREIGN PATENT DOCUMENTS
EP 0 905 563 A2 3/1999
(Continued)

OTHER PUBLICATIONS
Toby Kay, "Shopping has never been so easy", The Times, London, Apr. 3, 1999, p. 18.*
(Continued)

Primary Examiner—Jeffrey A. Smith
Assistant Examiner—Mila Airapetian
(74) Attorney, Agent, or Firm—Crawford Maunu PLLC

(57) ABSTRACT

An e-commerce method involves on-line viewing of a first article through a linking node for virtual merging on another structure. A particular application of the invention is directed to a gifting method via on-line apparel shopping. The method includes providing a host-site accessible to an on-line viewer (customer) and web-linkable to a retailer having an apparel site. The retailer's apparel site has images of articles stored in a virtual closet. These articles can be apparel from retail stores for viewing over the web, and the on-line viewer is linked to the host-site. The consumer selects a structure, such as a photograph of a person captured in system memory, in response to a command received by the on-line viewer. Using the host-site, the viewer or customer is linked to the retailer's apparel site and images are passed from that site for view by the shopper. An email image is sent as a gift to a recipient (with the recipient modeling the selected apparel) and the recipient selects or shops for different apparel to try on. Once selected, the giver is billed for the transaction.

12 Claims, 2 Drawing Sheets

U.S. PATENT DOCUMENTS

| | | | |
|---|---|---|---|
| 4,258,478 A | 3/1981 | Scott et al. | |
| 4,261,012 A | 4/1981 | Maloomian | 358/93 |
| 4,297,724 A | 10/1981 | Masuda et al. | 358/93 |
| 4,434,467 A | 2/1984 | Scott | 364/400 |
| 4,514,178 A | 4/1985 | Noto et al. | |
| 4,539,585 A | 9/1985 | Spackova et al. | 358/93 |
| 4,546,434 A | 10/1985 | Gioello | 364/300 |
| 4,731,743 A | 3/1988 | Blancato | 364/521 |
| 4,839,743 A | 6/1989 | Best et al. | |
| 4,843,574 A | 6/1989 | Gerber | |
| 4,845,636 A | 7/1989 | Walker | 364/479 |
| 4,854,880 A | 8/1989 | Nasby | |
| 4,872,056 A | 10/1989 | Hicks et al. | 358/183 |
| 4,885,844 A | 12/1989 | Chun | |
| 4,931,929 A | 6/1990 | Sherman | |
| 4,964,043 A | 10/1990 | Galvin | 364/401 |
| 4,991,005 A | 2/1991 | Smith | 358/93 |
| 5,053,956 A | 10/1991 | Donald et al. | 364/401 |
| 5,111,392 A | 5/1992 | Malin | 364/401 |
| 5,117,354 A | 5/1992 | Long et al. | 364/401 |
| 5,129,719 A | 7/1992 | Dombrosky | |
| 5,163,006 A | 11/1992 | Deziel | 364/470 |
| 5,163,007 A | 11/1992 | Slilaty | 364/470 |
| 5,195,030 A | 3/1993 | White | |
| 5,197,016 A | 3/1993 | Sugimoto et al. | |
| 5,206,804 A | 4/1993 | Thies et al. | 364/401 |
| 5,244,131 A | 9/1993 | Hollingsworth | |
| 5,339,250 A * | 8/1994 | Durbin | 700/237 |
| 5,339,252 A | 8/1994 | White et al. | 364/468 |
| 5,366,910 A | 11/1994 | Ha et al. | |
| 5,440,479 A | 8/1995 | Hutton | 364/401 |
| 5,495,568 A | 2/1996 | Beavin | 395/161 |
| RE35,184 E | 3/1996 | Walker | 364/479 |
| 5,504,845 A | 4/1996 | Vecchione | 395/119 |
| 5,510,846 A | 4/1996 | Guichard et al. | |
| 5,515,268 A | 5/1996 | Yoda | 364/401 |
| 5,530,652 A | 6/1996 | Croyle et al. | 364/470 |
| 5,539,677 A | 7/1996 | Smith | |
| 5,550,746 A | 8/1996 | Jacobs | |
| 5,550,976 A | 8/1996 | Henderson et al. | |
| 5,551,021 A | 8/1996 | Harada et al. | 395/600 |
| 5,555,496 A | 9/1996 | Tackbary et al. | 364/401 |
| 5,559,714 A | 9/1996 | Banks et al. | 364/479.03 |
| 5,568,595 A | 10/1996 | Yosefi et al. | |
| 5,593,072 A | 1/1997 | Hester et al. | |
| 5,598,344 A | 1/1997 | Dangelo et al. | |
| 5,603,043 A | 2/1997 | Taylor et al. | |
| 5,608,852 A | 3/1997 | Hashimoto et al. | 395/135 |
| 5,611,730 A | 3/1997 | Weiss | 463/20 |
| 5,625,781 A | 4/1997 | Cline et al. | |
| 5,631,974 A | 5/1997 | Lau-Kee et al. | |
| 5,680,314 A | 10/1997 | Patterson et al. | 364/470.03 |
| 5,680,528 A | 10/1997 | Korszun | |
| 5,682,220 A | 10/1997 | Sherman et al. | |
| 5,684,963 A | 11/1997 | Clement | 395/226 |
| 5,687,259 A | 11/1997 | Linford | |
| 5,694,551 A | 12/1997 | Doyle et al. | 395/226 |
| 5,708,838 A | 1/1998 | Robinson | |
| 5,724,522 A | 3/1998 | Kagami et al. | 395/226 |
| 5,729,699 A | 3/1998 | Hashimoto et al. | 395/227 |
| 5,737,729 A | 4/1998 | Denman | 705/401 |
| 5,740,801 A | 4/1998 | Branson | |
| 5,742,931 A | 4/1998 | Spiegelhoff et al. | 705/8 |
| 5,745,681 A | 4/1998 | Levine et al. | 395/200.3 |
| 5,754,434 A | 5/1998 | Delfer et al. | |
| 5,754,850 A | 5/1998 | Janssen | 395/615 |
| 5,768,591 A | 6/1998 | Robinson | |
| 5,774,670 A | 6/1998 | Montulli | |
| 5,781,714 A | 7/1998 | Collins et al. | |
| 5,802,530 A | 9/1998 | Van Hoff | |
| 5,806,046 A | 9/1998 | Curran et al. | |
| 5,822,216 A | 10/1998 | Satchell, Jr. et al. | 364/479.01 |
| 5,822,739 A | 10/1998 | Kara | 705/410 |
| 5,845,263 A | 12/1998 | Camaisa et al. | 705/27 |
| 5,848,399 A | 12/1998 | Burke | |
| 5,850,222 A | 12/1998 | Cone | 345/418 |
| 5,850,466 A | 12/1998 | Schott | |
| 5,852,809 A | 12/1998 | Abel et al. | 705/26 |
| 5,854,850 A | 12/1998 | Linford et al. | |
| 5,864,851 A | 1/1999 | Breitbart et al. | 707/8 |
| 5,870,140 A | 2/1999 | Gillberry | 348/160 |
| 5,870,718 A | 2/1999 | Spector | 705/26 |
| 5,870,771 A | 2/1999 | Oberg | 707/502 |
| 5,875,108 A | 2/1999 | Hoffberg et al. | |
| 5,880,974 A | 3/1999 | Tarumi et al. | 364/578 |
| 5,881,234 A | 3/1999 | Schwob | |
| 5,884,029 A | 3/1999 | Brush, II et al. | 395/200.32 |
| 5,890,175 A | 3/1999 | Wong et al. | |
| 5,892,946 A | 4/1999 | Woster et al. | 395/680 |
| 5,895,454 A | 4/1999 | Harrington | 705/26 |
| 5,905,973 A | 5/1999 | Yonezawa et al. | 705/27 |
| 5,907,617 A | 5/1999 | Ronning | |
| 5,914,713 A | 6/1999 | Nario et al. | |
| 5,920,830 A | 7/1999 | Hatfield et al. | |
| 5,923,324 A | 7/1999 | Berry et al. | 345/334 |
| 5,930,769 A * | 7/1999 | Rose | 705/27 |
| 5,937,391 A | 8/1999 | Ikeda et al. | |
| 5,946,665 A | 8/1999 | Suzuki et al. | 705/26 |
| 5,950,165 A | 9/1999 | Shaffer et al. | 704/270 |
| 5,950,173 A | 9/1999 | Perkowski | 705/26 |
| 5,970,471 A | 10/1999 | Hill | |
| 5,974,400 A | 10/1999 | Kagami et al. | 705/26 |
| 5,978,570 A | 11/1999 | Hillis | |
| 5,978,833 A | 11/1999 | Pashley et al. | |
| 5,983,200 A | 11/1999 | Slotznick | 705/26 |
| 5,983,201 A | 11/1999 | Fay | 705/27 |
| 5,983,267 A | 11/1999 | Shklar et al. | 709/217 |
| 5,986,670 A | 11/1999 | Dries et al. | |
| 5,991,739 A | 11/1999 | Cupps et al. | |
| 5,995,943 A | 11/1999 | Bull et al. | 705/14 |
| 6,002,855 A | 12/1999 | Ladner et al. | 395/500.01 |
| 6,009,413 A | 12/1999 | Webber et al. | 705/26 |
| 6,014,638 A | 1/2000 | Burge et al. | |
| 6,016,504 A | 1/2000 | Arnold et al. | 709/200 |
| 6,017,157 A | 1/2000 | Garfinkle et al. | |
| 6,026,368 A | 2/2000 | Brown et al. | |
| 6,026,376 A | 2/2000 | Kenney | 705/27 |
| 6,026,377 A | 2/2000 | Burke | 705/27 |
| 6,029,141 A | 2/2000 | Bezos et al. | |
| 6,029,142 A | 2/2000 | Hill | |
| 6,037,936 A | 3/2000 | Ellenby et al. | |
| 6,047,268 A | 4/2000 | Bartoli et al. | |
| 6,052,729 A | 4/2000 | Robinson | |
| 6,058,417 A | 5/2000 | Hess et al. | |
| 6,064,978 A | 5/2000 | Gardner et al. | |
| 6,072,944 A | 6/2000 | Robinson | |
| 6,083,267 A | 7/2000 | Motomiya et al. | |
| 6,089,424 A | 7/2000 | Colquhoun | |
| 6,091,417 A | 7/2000 | Lefkowitz | |
| 6,094,644 A | 7/2000 | Hillson et al. | |
| 6,125,352 A | 9/2000 | Franklin et al. | |
| 6,134,593 A | 10/2000 | Alexander et al. | |
| 6,144,388 A | 11/2000 | Bornstein | |
| 6,170,017 B1 | 1/2001 | Dias et al. | |
| 6,177,936 B1 | 1/2001 | Cragun | |
| 6,236,979 B1 | 5/2001 | Kawabata | |
| 6,260,024 B1 | 7/2001 | Shkedy | |
| 6,293,284 B1 | 9/2001 | Rigg | |
| 6,301,044 B1 | 10/2001 | Huber et al. | |
| 6,304,851 B1 | 10/2001 | Kmack et al. | |
| 6,307,568 B1 * | 10/2001 | Rom | 345/629 |
| 6,310,627 B1 | 10/2001 | Sakaguchi | |
| 6,317,722 B1 | 11/2001 | Jacobi et al. | |
| 6,331,858 B2 | 12/2001 | Fisher | |

| | | |
|---|---|---|
| 6,336,136 B1 | 1/2002 | Harris |
| 6,339,763 B1 | 1/2002 | Divine et al. |
| 6,343,264 B1 | 1/2002 | Fenton et al. |
| 6,348,923 B2 | 2/2002 | Murata |
| 6,349,300 B1 | 2/2002 | Graf et al. |
| 6,353,770 B1 | 3/2002 | Ramsey et al. |
| 6,356,264 B1 | 3/2002 | Yasui et al. |
| 6,381,583 B1 | 4/2002 | Kenney |
| 6,404,426 B1 | 6/2002 | Weaver |
| 6,405,175 B1 | 6/2002 | Ng |
| 6,405,176 B1 | 6/2002 | Toohey |
| 6,417,861 B1 | 7/2002 | Deering et al. |
| 6,437,782 B1 | 8/2002 | Pieragostini et al. |
| 6,449,660 B1 | 9/2002 | Berg et al. |
| 6,453,300 B2 | 9/2002 | Simpson |
| 6,456,938 B1 | 9/2002 | Barnard |
| 6,567,837 B1 | 5/2003 | Robinson |
| 6,615,279 B1 | 9/2003 | Robinson |
| 6,633,849 B1 * | 10/2003 | Dodd .......................... 705/1 |
| 6,727,928 B1 | 4/2004 | Richter |
| 6,771,801 B1 | 8/2004 | Fisher et al. |
| 6,785,671 B1 | 8/2004 | Bailey et al. |
| 2005/0197919 A1 * | 9/2005 | Robertson ................... 705/26 |

FOREIGN PATENT DOCUMENTS

| | | | |
|---|---|---|---|
| JP | 410124589 | * | 5/1998 |
| WO | WO 01/04840 A1 | | 1/2001 |

OTHER PUBLICATIONS

J.D. Biersdorfer, "Trying on Clothes in a Virtual Dressing Room", New York Times, Oct. 14, 1999, p. G10. http://proquest.umi.com/pqdweb?did=45548879&Fmt=3&clientId=19649&RQT=309&VName=PQD☐.*
"High Fashion Meets High Tech" Business Wire (Sep. 28, 1998).
Szadkowkski, J. "Taking a Walkabout through room design," Washington Times (Sep. 17, 1998).
Cummings, J. "Dream It," Dayton Daily News (Nov. 12, 1998).
Zimmerman, K.A. "Land's End Adds Personalized Models to Web Site catalog Firm Offering Women Chance to Try On Clothes on a Virtual Model," Daily News Record, (Nov. 25, 1998).
"A Sampling of Computer Home Design Programs," Orlando Sentinel (Jun. 14, 1998).
www.weddingchannel.com, link to registry.
"Object-Oriented Analysis and Design," G. Booch, Addison Wesley Longman, Inc. ISBN: 0-8053-5340-2, 1994.
"On Remote Procedure Call," P. Soares. IBM Center for Advanced Studies Conference, vol. 2, pp. 215-267, IBM Press 1992.
Kuchinskas, Susan "The E-commerce Cometh", Media week, vol. 8, No. 35, Sep. 21, 1998 [retrieved from Dialog on Apr. 30 2002]. Retrieved from Dialog File: 15, Accession #: 01708699.
Hamit, Francis "ModaCAD's Model for Fashion E-Commerce Points the Way to Imaging-Based Interactivity", Advanced Imaging, vol. 14, No. 2, Feb. 1999 [retrieved on Apr. 30, 2002]. Retrieved from Dialog File: 9, Accession #: 02388938.
"The Cosmopolitan Virtual Makeover" www.marketwiz.net!cosmo/press.
Seckler, Valerie "A Fashion Trip for Women on the Web", WWD, Aug. 17, 1998 [retrieved on Apr. 30 2002]. Retrieved from Dialog File: 570, Accession #: 01683272.
Zimmerman, Kim "Fashion Trip Combines CD, Web Access", DNR, vol. 28, No. 101, Aug. 26, 1998 [retrieved on Apr. 30, 2002]. Retrieved from Dialog File 9, Accession #: 02230722.
Orr, J.N., "Good Design," CAE, vol. 11, No. 6, pp. 62, Jun. 1992.
Taylor, W., "Windows Draw 4.0," PC/Computing, vol. 9, No. 4, p. 204, Apr. 1, 1996.
Anon., Newsbytes News Network, "Comdex—Free Graphics E-mail from SPC Software," Nov. 19, 1997.
Anon., Sunglass Hut's Eyes Are Focused on the Internet, Chain Store Age Exeuctive, vol. 74, No. 9, p. 188+, Sep. 1998.
Langberg, M., Technololgy Testdrive Column in San Jose Mercury News, Jan. 10, 1999.

Grimm, M., "Levi Buttons up 501 Blitz," Brandweek, Nov. 22, 1993, p. 4.
Donnally, T., "Coming out of the Cabana," San Francisco Chronicle, May 4, 1996, p. E1.
Vine, R., "Pierre Mercier at Laage-Salomon," Art in America, vol. 84, No. 4, p. 125, Apr. 1996.
Johnson, R.C., "PC Video System Simplifies Security," Electronic Engineering Times, p. 33+, Apr. 8, 1996.
Carrano et al. "Data Abstraction and Problem Solving the C++", second edition, 1998, pp. 15-25.
No author, "Online Shops Linger in Future," HFN, v 70, n 32, p. 12, Aug. 5, 1996. Retrieved from Dialog File: 9, Acc# 01570816.
J.D. Biersdorfer, "Trying On Clothes in a Virutal Dressing Room," Oct. 14, 1999.
Fried, Ian "ModaCAD Latest to Seek Net Gain on Apparel," retrieved on Sep. 3, 1999 from www.apparelnews.net/Archive/082898/fashion/fashfeat.html.
No author, "Internet Venture Plans Virtual Fashion Mall," Nikkei Weekly, Feb. 22, 1999 [retrieved on Apr. 30, 2002]. Retrieved from Dialog File: 728, Accession #: 00885324.
QuickyMart™ Cuts Cost, Eases Set-Up of 'Me-Commerce' Sites: PR Newswire (Jul. 28, 1999).
"Herman Miller's New online 'Room Planner' Makes Designing from Home Fun and Easy" PR Newswire (Mar. 18, 1999).
www.amazon.com (*not enclosed*).
http://jsharones.com/prod013234.h(*not enclosed*).
http://www.cspring.com/aero_lettening/c_match.htm(*not enlosed*).
www.virtualmakeover.com.
www.sesoft.com/customer/index.html.
"The World's First Whole Body Scanners Bring True Human Forms to Computer Graphics," http://www.cyberware.com/pressReleases/firstWB.html (May 11, 1995), 1 page.
"ModaCAD Latest to Seek 'Net Gain on Apparel," http://www.apparelnews.net/Archive/082898/fashion/fashfeat.html (Aug. 28, 1998), 3 pages.
"Wicks and Wilson TriForm® BodyScan booth-first time in USA," www.wwl.co.uk.
"Wicks and Wilson announces its first Body Scanning booth," www.wwl.co.uk.
"Wicks and Wilson TriForms® 3D system helps to take goalkeeping into the space age," www.wwl.co.uk.
"Modacad, Inc. Launches Women's E-commerce 'Style' Shopping Site," http//www.urlwire.com/newsarchive/050399a.html (May 3, 1999), 2 pages.
"Populating the Web: Pioneering a paradigm for photo realistic Avatars," http://www.avatarme.com/concept/concept.htm (Aug. 1999), 5 pages.
"PhotoModeler High Quality Photo-Textured Objects," http://www.eossystem.com/phototex.htm (copyright 1995-1999), 10 pages.
*Land's End Direct Merchants* Catalogue (Sep. 1999), p. 101. www.landsend.com.
"Macys.com To Sell Borderbund Makeover Software,". http//dailynews.yayoo.com/h/nm/19990903/tc/macyscom_2.html (Sep. 3, 1999), 2 pages.
"If the Jeans Fit . . . p. 3: Three Hours Later," http//www.upside.com (Sep. 3, 1999), 1 page.
"When Off-The Rack Becomes Off-The-Net," *Scientific American Presents you Bionic Future* (Nov. 1999), 5 pages.
"Macy's Eases Swimsuit Fear with Database," http://www.wired.com/news/news/story/3226.html (Apr. 17, 1997), 2pages.
"Fashion Studio," http://www.dynagraphicsinc.com/main.htm (Sep. 14, 1999), 4 pages.
"What is the Dressing Sim?," http://www.toyobo.co.jp/e/mirai/dr...gsim/TopPage/aboutDressingSim.html (Sep. 14, 1999), 5 pages.
Nebojsa Jojic, http://ww.ifp. uiuc.edu/'jojic/ (Sep. 14, 1999), 5 pages.
A Framework for Garment Shopping over the Internet, Jojic et al., *Handbook of Electronic Commerce* (May 1999), 22 pages.
Media Motion Publications, Flash 'N Fashion (Copyright 1995-1997), 3 pages. www.media-motion.com.
Meta Creations Poser 4, (Sep. 14, 1999), 3 pages. www.metacreations.com.

"Finding a Look," *New York Times* (Oct. 14, 1999), 1 page.
"3D Metrics-Capturing the Dimension of Life," http://www.3dmetrics.com (copyright1999), 1 pages.
"Welcome to Click Dress," http://www.hi-pic.co.il/ (Dec. 7, 1999), 1 page.
"Killer Loop Virtual Preview," http://www.killerloopeyewear.com/html/klvp.html (Dec. 2, 1999), 1 page.
www.peepsun.com.
http://marketwiz.net.
www.pearlvision.com.
www.beyond.com.
http.//orders.xoom.com.
www.itreviews.com.
"Welcome to Ray Ban Virtual Review," http://www.rayban.com/htm/rbvp.html (Dec. 2, 1999), 2 pages.
Korolenko, Michael; User's Manual for Fashion Trip software produced by Sierra Home. 1998.
http://compuzloz.com/ImaginaRelease.html, Feb. 5, 1998.

* cited by examiner

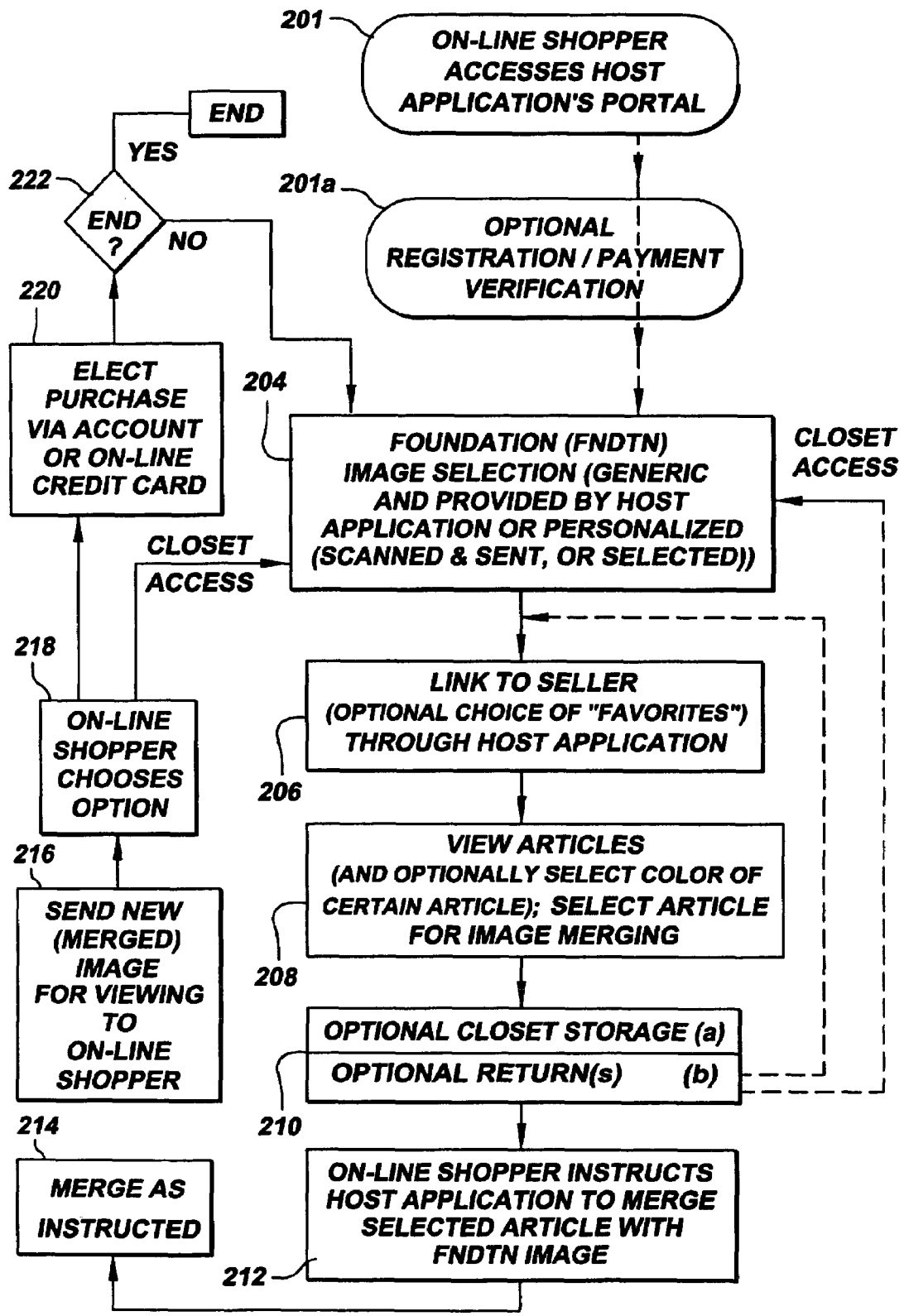

METHOD FOR ELECTRONIC GIFTING USING MERGING IMAGES

RELATED PATENT DOCUMENTS

This is a divisional of patent application Ser. No. 09/527,986, filed on Mar. 17, 2000, now abandoned which claims priority to, U.S. Provisional Patent Applications, Nos. 60/159,476 and 60/167,493, respectively filed Oct. 14, 1999 and Nov. 24, 1999, to which Applicant claims priority under 35 U.S.C. § 120, and which is fully incorporated herein by reference.

FIELD OF THE INVENTION

The present invention relates generally to e-commerce and, more specifically, to use of linked web servers sites for on-line shopping.

BACKGROUND OF THE INVENTION

The consumer in today's market is limited to a particular retailer's or department store's inventory, selection and styles. Traditionally, a consumer shops for items from different stores with the anticipation and hope that the items will coordinate. Alternatively, a consumer will wait for an opportunity to try on all the different items purchased and return those items that do not coordinate. Recent technological advances have attempted to enhance the shopping ability through the use of e-commerce, sometimes referred to as "online buying" or "online shopping."

There are differences inherent between "online buying" and "online shopping" in that current e-commerce transactions are based on the individual buying goods or services online that they have either decided to buy prior to logging on to the internet or find as a result of bargain hunting on the internet. There is very little, if any, true shopping on the internet. Most women define shopping as an "experience" "fun" "exciting" and the like. True shopping is going to a mall or department store with the intention of buying yet to be determined goods or services. Few consumers are getting on the internet with the same mindset that they have before they physically go shopping. It is the difference between logging onto the internet to buy an additional pair of Levi's Jeans and going shopping and then coming home with 2 pairs of Levi's Jeans, a belt, 2 sweaters and 2 shirts. Amazon, for instance, tries to recreate the "shopping experience" by offering reviews by other customers and suggestions for other books which may interest the shopper based on the book the consumer is currently purchasing.

Another problem arises when "Online shopping" with the intent to "online buy" for someone else. This situation is common for birthdays and also in connection with holidays when use of such gifting on the internet peaks. Using apparel as an example, when the online-shopper ("the giver") purchases a shirt for another ("the recipient"), if the shirt is the wrong color size or style, the recipient typically thanks the giver without addressing the inappropriateness of the gift or asks the giver to exchange the gift for something that the recipient specifies. This practice discourages use of this type of gifting because the giver is burdened with addressing and undoing the transaction; thereby transforming an otherwise simple transaction into a relatively complex transaction involving multiple internet communications.

SUMMARY OF THE INVENTION

One aspect of the present invention is generally directed to an e-commerce gifting method involving on-line viewing of a first article through a linking node for virtual merging on another structure. A particular application of the invention is directed to a gifting method via on-line apparel shopping. The method includes providing a host-site accessible to an on-line viewer (shopping customer intending to gift an article) and web-linkable to a retailer having an apparel site. The retailer's apparel site has images of articles stored in a virtual closet. These articles can be apparel from retail stores for viewing over the web, and the on-line viewer is linked to the host-site. The consumer selects a structure, such as a photograph of a person captured in system memory, in response to a command received by the on-line viewer. Using the host-site, the viewer or customer is linked to the retailer's apparel site and images are passed from that site for view by the shopper. An email image is sent as a gift to a recipient (with the recipient modeling the selected apparel) and the recipient selects or shops for different apparel to try on. Once selected, the giver is billed for the transaction.

The above summary of the present invention is not intended to describe each illustrated embodiment or every implementation of the present invention. The figures in the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 2 is a flowchart of an example manner for implementing one aspect of the present invention.

Figure 1:
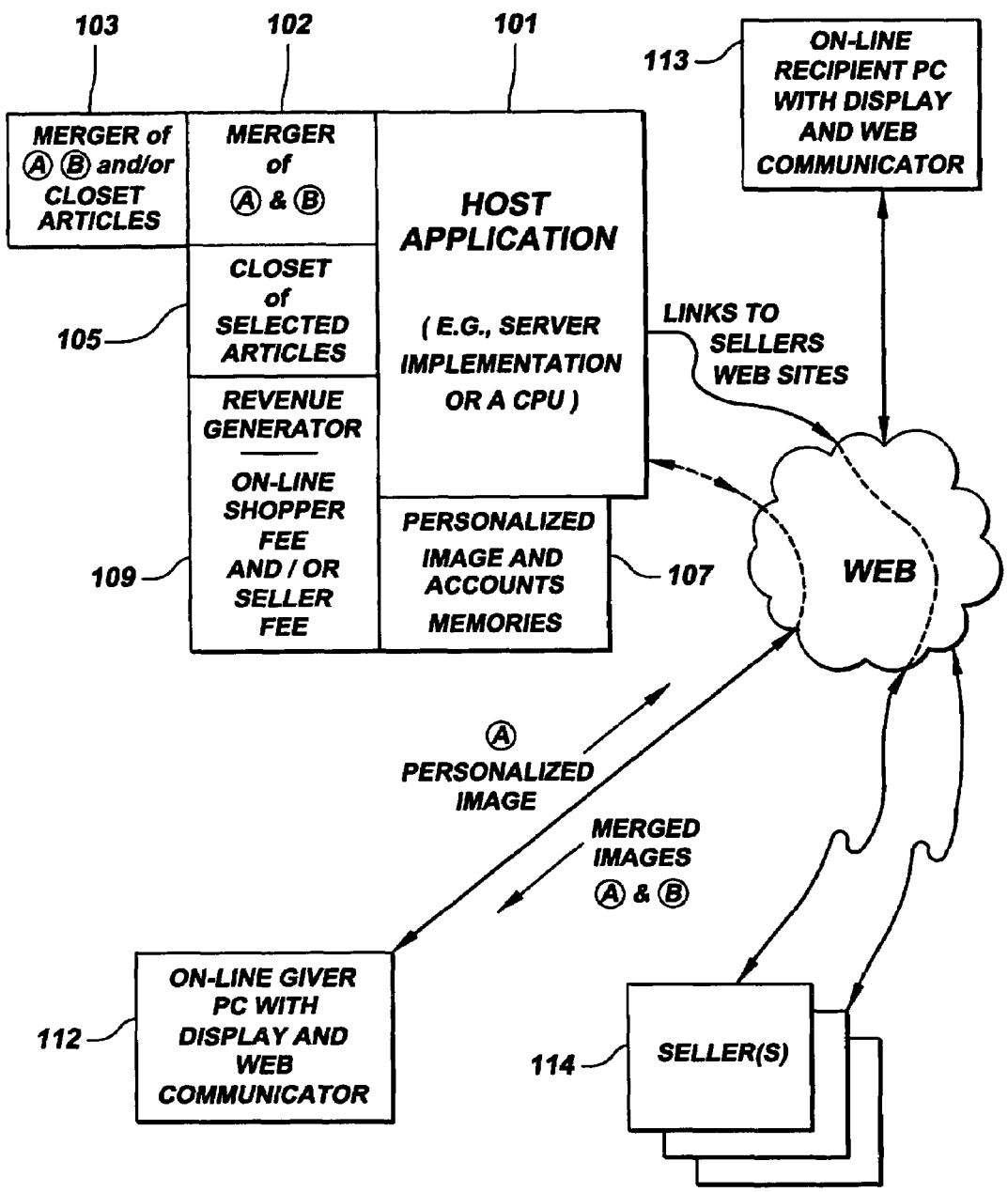
FIG. 1 illustrates a block diagram of a system for implementing the present system in accordance with one example embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is generally directed to a method and system involving e-commerce gifting over interconnected communication networks such as those currently known as the Internet. The present invention is particularly suited for conveniently bringing virtual apparel into customers' respective homes and permitting customers to try on the apparel before accepting/purchasing the apparel. While the present invention is not necessarily so limited, a better understanding of the invention will be found by reading the detailed description and exemplary embodiments that follow.

FIG. 1 illustrates an example embodiment of a method and system for implementing the present system. The system includes a host application server 101 including several example functional blocks. These blocks include a block 102 that merges two images A and B (e.g. corresponding to a personalized or generic article identified by the on-line shopper, and a foundation or structure image to be merged with the identified article). Another block 103 permits merging of images selected from A, B, and/or articles previously stored in a "closet," depicted as block 105. Another block 107 includes personalized images and an inventory of generic images corresponding to the foundation or structure. A revenue generator block 109 provides fee generation from on-line shoppers who subscribe to the host application server per on-line or off-line agreement, and/or fee generation from retailers (or sellers) and others such as magazine publishers desiring participation and benefit from the system of FIG. 1.

The on-line shopper, or "giver", uses a PC or intelligent black box 112 to access the host application server 101. Through this access, the on-line shopper either selects a generic structure from an inquiry of such structures provided by block 107 or provides a personalized image (for example, a scanned image of himself, the "recipient," an image of a generic prestored model of a man or woman, or an image of prestored model selected by the giver as someone who looks like the recipient) to be used as the structure. Using the host application server 101, the on-line shopper is coupled through the web to a seller, depicted at block 114. Images of selectable articles are communicated back to the on-line shopper over the web and through the host application server 101. The on-line shopper selects one or more articles from at least one of the sellers for storage in the closet 105, and/or for merging with the previously-selected structure. Similarly, the structure can be changed per a command from the on-line shopper so as to merge the selected article(s) with different structures. In response, the host application server 101 processes images corresponding to the article and structure and generates a new image including representations of both the structure and the article. This new image is then electronically sent, e.g., as part of an email wishing the recipient a "happy birthday." In the example shown in FIG. 1, this occurs over the web to the recipient's PC or intelligent black box 113.

In response to receiving the image (e.g., via email), depending upon the implementation, the recipient has a number of options. Where the implementation involves the giver and the recipient being members of an on-line shopping subscription service provided by the host application 101 (e.g., consideration paid monthly or by use), the recipient logs onto the host application 101 via a link provided with the email and opens the file for displaying the image. If desirable, the recipient can accept the gift and thereby automatically cause the host application 101 to charge the purchase to the giver (optionally, without the recipient seeing the purchase price). If the gift is undesirable, the recipient can shop for and select an alternate gift by accessing articles provided by sellers 114 via the host application 101 and/or changing the structure upon which the articles are modeled. Once the recipient finds and selects the desired article, the selection automatically causes the host application 101 to charge the purchase to the giver. If the giver has set a predetermined spend limit on the gift and the recipient's selection exceeds the limit (or has place a time limit when the gift selection is no longer valid), the host application 101 can reject the selection and explain the occurrence to the recipient (e.g., request that the recipient shop for and select a less expensive gift or, alternatively, the host application 101 can email the giver and ask for approval on the higher amount). When initiating this gift transaction, the giver can elect which protocol to use. In response to a completed selection, the giver is sent a confirming email that identifies various data about the transaction, including, for example, the gift selected, the price, the shopping time period, the time at which the gift was selected. The recipient is also provided an email with instructions explaining how to exchange the gift once it is received from the retailer (optionally via the host application 101).

If the recipient is not a member of the database, the giver can elect to use a guest pass or pay an additional amount for a use by the recipient. The host application 101 can also invite the recipient to become a member.

Alternatively, the recipient can be provided a gift certificate in response to not selecting any gift or not choosing to become a member.

The above approach is advantageous in that there is no transaction, and therefore no charge, until the recipient selects the gift, and the seller does not have to deal with any returned items.

FIG. 2 is a flow chart of an example process for implementing the example system of FIG. 1, according to the present invention. It will be understood that the recipient can have the same shopping experience as the giver. As discussed above, after accessing the host application server 201, optionally the host application server verifies registration/payment as is conventional with current on-line shopping as depicted at 201*a*. At block 204 the structure or foundation is selected as discussed above, and at block 206 the link is made to the seller. At block 208 the article(s) is viewed by the on-line shopper and, optionally, a selection of a color and/or size for the article is made. Next, the on-line shopper selects the article as a candidate for storage in the closet and/or for merging with the structure.

At block 210 the on-line shopper instructs the host application server to store the article in the closet by returning to block 204, merge with the structure as depicted at block 212, or return to block 206 for linking to the same seller or another seller for additional viewing.

From block 212 flow proceeds to block 214 where the new image is created per the merger instruction.

Next, at block 216, the new image is sent for viewing to the on-line shopper.

At block 218 the on-line shopper chooses one of multiple options. The closet is accessed and the on-line shopper returns to block 204, or an election is made to purchase the article and/or other articles that may have been stored in the closet as depicted in block 220. From block 220, flow proceeds to block 222 where the on-line shopper decides to return to block 204 or end the transaction.

Example articles can be: A) clothing; B) paint; C) furniture; D) glassware; E) landscaping; F) orthodontic and teeth ware; G) cabinetry; H) plastic-surgery type enhancements; I) car/person.

Example foundation for merger with corresponding article(s) can be: a) person, pet; b) house, cars, etc.; c) house, cars, office, etc.; d) kitchen, face; e) yard; f) mouth; g) rooms in office/house; h) person (chest, face, belly, etc.); I) person/car.

In another example embodiment according to the present invention, an important advantage relating to color matching is achieved using a commonly-used color standard that covers sufficient color variations to permit various articles to be matched to one another. In one more specific embodiment, an industry color-standardization scheme is used. Examples include: Exxel Color Match Guide (see the website for "The J Sharones Online Internet Showroom") and Color match Chart (see the website of CSprings-Aereo Lettering & Graphics). More sophisticated color standardization schemes include the above examples in combination with equipment specifically identifying a frequency range corresponding to the color of the article in question or the equipment approach by itself.

Example equipment of this type includes optics-based detectors adapted to provide a measured (color) frequency in a given light condition/environment. For example, white light may be used along with selected background materials characterized within certain selected ranges of reflectivity. Other definitional parameters needed and/or useful in connection therewith will be apparent to those skilled in the art.

In a particular application, the color frequencies measured for the articles to be matched are reported and provided in the form of a tag that is carried with the article, electronically for the web server shopping function and, optionally, as a supplemental hard-copy coded label (e.g., as part of or as a supplementation to the coding used on a bar code label). In a more particular implementation involving this use as part of the bar code label, the conventional bar code scanners and bar code generators are modified and adapted to receive the color frequency of the article and to conveniently report the color frequency in conjunction with the electronic shopping function and/or the conventional/reality shopping applications.

In yet another more specific embodiment, the closet of selected articles (as described for example in connection with block 105 of FIG. 1) is electronically defined using a partial-data set corresponding to each of the closeted articles. In one application thereof, the partial-data set comprises an outline definition of each of the articles along with the color frequency codes linked to the various sections of each article, as necessary to fully define the article in terms of article shape and color. Further, the size of the article is also stored as part of the partial-data set. Collectively, these various pieces advantageously define all needed aspects of each article in the closet without having to consume excessive amounts of memory and without requiring excessive processing to recreate the article for view by the user.

The virtual closet discussed above in connection with FIG. 1 can be used to permit the shopper to buy or hold (without buying) an article and subsequently retrieving the article for matching to other articles in terms of structure, size, color and other stylistic aspects. In applications concerned with limited memory bandwidth, the host application can provide a maximum amount of storage space for each shopper, with additional storage space being provided for a fee. These data stored in such memory is limited to a fixed-period, e.g., one month, with extensions being provided for yet additional consideration, such as a monthly fee or purchases of items stored in the closet during an immediately preceding period. This approach advantageously encourages the shoppers to revisit the host application repeatedly to access their personalized virtual closet, and advantageously provides on-going advertising for (which is also optionally billed on a related, on-going basis to) the seller/retailers.

According to another aspect of the present invention, on-line shoppers (for example 112 of FIG. 1) are provided a number of selectable icons or other data permitting feedback from the host/server (for example 101 of FIG. 1). Examples include: expert fashion advice (e.g., professional consultants employed by the retailers (for example sellers 114 of FIG. 1), outside fashion consultants and/or employees of the entity providing the host application (101 of FIG. 1); on-line offers from the sellers (discounts, sales, etc.); updates on up-coming styles, colors, the most recent and hottest fashions. Each of these various offerings is optionally categorized for convenient selection by the shopper/user, for example, by category, style, activities, retailers. Advantageously, this application permits the host application to provide the sellers unique demographic information pertaining to particular customers' interests, selection trends and other data useful in attracting the shoppers to the retailers.

For convenience to the shoppers, a feedback icon can be used to provide a "favorite retailers" list to be defined by each shopper. When the shopper logs onto the host application, any of these favorite retailers can be immediately linked to for various uses. Examples include: reviewing closeted items and making changes thereto for a particular retailer, checking sales at that particular retailer and/or continuing to shop at a particular retailer without being required to return to the host application web site. Further, as a shopper links from retailer to retailer (the "Favorites"), a "shopping basket" can be selected and filled as the shopper accesses the articles According to another important aspect of the present invention, the host application includes a search engine that searches selected, or all, participating sellers/retailers for particular merchandise, as identified by the on-line shopper. In one implementation, this service is provided to the shopper using a selectable icon or other feedback data as discussed above. At this point, the host application can: list all such retailers and allow the shopper to link to their web site; virtually pull the item from the respective web sites and allow the shopper to "try on" the article or store it in the closet (with a variation which optionally permits the shopper to change the size and color); and/or a combination of these approaches.

Implementation of the merging function can be accomplished using one or more of a variety of currently-available methods. Examples of such methods include those used in connection with the web sites of Virtual Makeover and Segasoft as of the filing date of this Application.

Other example implementations are described and illustrated in U.S. Pat. No. 5,930,769 entitled, "System and Method for Fashion Shopping." Various types of software and hardware can be used to implement each aspect of the system and method described.

This application is also related to and incorporates by reference the subject matter of U.S. patent application Ser. No. 09/531,101, "Previewing Combinations Of Articles", now abandoned.

As noted above, the present invention is applicable to a number of techniques for merging various types of structures, or foundations, with one or more corresponding articles. The present invention should not be considered limited to the particular examples described above, but rather should be understood to cover all aspects of the invention as fairly set out in the attached claims. For example, the present invention could be characterized as covering one or more of the above characterized features. Accordingly, various modifications, equivalent processes, as well as numerous structures to which the present invention may be applicable will be readily apparent to the skilled artisan upon review of the present specification.

I claim:

1. A method for electronic gifting, comprising:
providing a host-site accessible to an on-line giver and a recipient and web-linkable to at least one article-provider site, the article provider site having images of commercial articles for view via the web;
linking the on-line giver to the host-site and selecting a structure in response to a command received from the on-line giver;
using the host-site, linking the on-line giver to a set of retailers including different article-provider sites and passing at least one visual image of a commercial article from one of the article-provider sites to the host-site for view by the on-line giver;

merging images of the commercial article and the structure by forming a composite image including visual representations of both the structure and the commercial article;

electronically gifting the commercial article to the recipient;

in response to receiving notification of the electronically gifted commercial article, linking the recipient to the host-site; and using the host-site to link the recipient to the set of retailers and passing visual images from at least one of the retailers' article provider sites to the host-site for view by the recipient, electronically exchange the electronically gifted commercial article for at least one other article selected by the recipient, and electronically bill the on-line giver for, and prompt shipment of, said at least one other article.

2. The method of claim 1, wherein in response to the recipient's selection, the host-site electronically queries permission from the on-line giver to enable exchange of the electronically gifted commercial article.

3. The method of claim 1 wherein the structure is created by the recipient and stored at the host-site.

4. The method of claim 1 wherein the on-line giver and the recipient are subscribers permitted access to the host-site.

5. The method of claim 1 wherein the giver is a subscriber permitted access to the host-site.

6. The method of claim 1 wherein images of more than one colored commercial article are electronically gifted and the host-site is adapted to compare color codes identifying respective colors of the more than one colored commercial article and, in response, to indicate whether the colored commercial articles satisfy a color-matching criterion.

7. The method of claim 1 further including after merging images of the commercial article and the structure by forming a composite image including visual representations of both the structure and the commercial article, storing partial-data sets of the commercial article in a virtual closet.

8. The method of claim 7 wherein the partial-data sets include a size.

9. The method of claim 7 wherein the partial-data sets include a color code.

10. The method of claim 1 wherein the host-site is adapted to electronically exchange the commercial article for at least one other article selected by the recipient from a different article-provider site than the article-provider site of the commercial article.

11. The method of claim 1 wherein the host-site is adapted to electronically bill the on-line giver after and only after the recipient selects an article.

12. A method for electronic gifting, comprising:

providing a host-site accessible to an on-line giver and a recipient and web-linkable to at least one article-provider site, the article provider site having images of commercial articles for view via the web;

linking the on-line giver to the host-site and selecting a structure in response to a command received from the on-line giver; and using the host-site to link the on-line giver to a set of retailers including different article-provider sites and passing at least one visual image of a commercial article from one of the article-provider sites to the host-site for view by the on-line giver, merge images of the commercial article and the structure by forming a composite image including visual representations of both the structure and the commercial article, electronically gift the commercial article to the recipient, electronically exchange the commercial article for at least one other article selected by the recipient from a different one of the retailers' article-provider sites, and in response to exchanging the electronically gifted commercial article, electronically bill the on-line giver for, and prompt shipment of, said other article.

* * * * *